(12) United States Patent
Wei et al.

(10) Patent No.: US 12,132,306 B2
(45) Date of Patent: Oct. 29, 2024

(54) BRCT CLAMPING ABSORPTION CIRCUIT WITH SHORT CIRCUIT PROTECTION

(71) Applicant: Shenzhen Hontech-Wins Electronics Co., Ltd., Shenzhen (CN)

(72) Inventors: Wencai Wei, Shenzhen (CN); Zhihua Zhang, Shenzhen (CN)

(73) Assignee: Shenzhen Hontech-Wins Electronics Co., Ltd., Shenzhen (CN)

( * ) Notice: Subject to any disclaimer, the term of this patent is extended or adjusted under 35 U.S.C. 154(b) by 257 days.

(21) Appl. No.: 18/050,773

(22) Filed: Oct. 28, 2022

(65) Prior Publication Data

US 2023/0238795 A1 Jul. 27, 2023

(30) Foreign Application Priority Data

Jan. 21, 2022 (CN) .......................... 202210072225.2

(51) Int. Cl.
*H02H 7/125* (2006.01)
*H02H 9/04* (2006.01)
*H05B 45/50* (2022.01)

(52) U.S. Cl.
CPC .......... *H02H 7/1257* (2013.01); *H02H 9/041* (2013.01); *H05B 45/50* (2020.01)

(58) Field of Classification Search
CPC ....... H02H 9/041; H02H 7/1257; H05B 45/50
See application file for complete search history.

(56) References Cited

U.S. PATENT DOCUMENTS

| | | | |
|---|---|---|---|
| 2013/0334980 A1* | 12/2013 | Zhou ................... | H05B 47/185 315/250 |
| 2016/0050724 A1* | 2/2016 | Moon ................... | H05B 45/48 315/200 R |
| 2019/0393698 A1* | 12/2019 | Joo ...................... | H02H 1/0007 |
| 2022/0272807 A1* | 8/2022 | Lu ......................... | H05B 47/26 |

* cited by examiner

*Primary Examiner* — Scott Bauer
(74) *Attorney, Agent, or Firm* — Inskeep IP Group, Inc.

(57) ABSTRACT

Disclosed is a BRCT clamping absorption circuit with short circuit protection, which relates to the technical field of short-circuit protection, includes a load module, a short-circuit detection module, a short-circuit protection module, a spike absorption module, a rectifying module, a clamping module and a main control module, wherein, the spike absorption module is connected with the load module, the rectifying module is connected with the spike absorption module, and the clamping module is connected with the rectifying module to form a clamping absorption protection for a spike voltage; the main control module is connected with the short-circuit detection module, and is used for controlling the on-off of a load regulator according to the short-circuit signal.

10 Claims, 5 Drawing Sheets

BRCT CLAMPING ABSORPTION CIRCUIT WITH SHORT CIRCUIT PROTECTION

RELATED APPLICATIONS

This application claims priority to Chinese Patent Application No. 2022100722252, filed Jan. 21, 2022, entitled Novel BRCT Clamping Absorption Circuit With Short Circuit Protection, in the China Intellectual Property Office, the entire disclosure of which is incorporated hereing by reference for app purposes.

TECHNICAL FIELD

The disclosure relates to the technical field of short-circuit protection, and more particularly, to a BRCT clamping absorption circuit with short-circuit protection.

BACKGROUND

The existing dimmer control has the following technical problems: once a welding point of a load end wire of the dimmer ignites due to the decrease in insulation (the welding point of a T-type wire is prone to ignition due to the decrease in insulation performance), or when a driving power supply of a LED lamp fails and is short-circuited, a power switching transistor field effect transistor (MOSFET) will usually be damaged, the fault is that the dimmer cannot achieve dimming, which has a great impact on the use scene of the dimmer, such as affecting the normal breeding operations of farmers, and the after-sales maintenance costs are high, so there are defects.

SUMMARY

In order to address the deficiencies of the existing technology, the present disclosure provides a BRCT clamping absorption circuit with short-circuit protection.

The technical schemes adopted by the present disclosure to address its technical problems are: a BRCT clamping absorption circuit with short-circuit protection, which includes a load module, a short-circuit detection module, a short-circuit protection module, a spike absorption module, a rectifying module, a clamping module and a main control module, the load module is connected to a power supply and a load, and is configured to provide a loop for the load; the short-circuit detection module is connected to the load module for sending a short-circuit signal when the load is short-circuited; the short-circuit protection module is connected with the short-circuit detection module, and the short-circuit protection module is connected with the load module, and is used for cutting off an output current of the load module when receiving the short-circuit signal of the short-circuit detection module; the spike absorption module is connected with the load module, the rectifying module is connected with the spike absorption module, and the clamping module is connected with the rectifying module to form a clamping absorption protection for a spike voltage; the main control module is connected with the short-circuit detection module, and is used for controlling the on-off of a load regulator according to the short-circuit signal.

In the above circuit, further including a discharging module, which is connected to the rectifying module for discharging the rectifying module.

In the above circuit, the load module includes a fuse F1, a current transformer CT1, a field effect transistor Q1 and a field effect transistor Q2, one end of the fuse F1 is connected to a L line of the power supply, and the other end of the fuse F1 is connected to one end of a primary side of the current transformer CT1, the other end of the primary side of the current transformer CT1 is connected to a drain of the field effect transistor Q1, a source of the field effect transistor Q1 is grounded, and a gate of the field effect transistor Q1 is connected to the short-circuit protection module, a drain of the field effect transistor Q2 is connected to the L line of the load, a gate of the field effect transistor Q2 is connected to the short-circuit protection module, and a source of the field effect transistor Q2 is grounded;

a secondary side coil of the current transformer CT1 is connected to the short-circuit detection module for providing a large current signal to the short-circuit detection module when the load is short-circuited.

In the above circuit, the short-circuit detection module includes a resistor R50, a resistor R51, a rectifier unit, a resistor R36, a comparator U7D, a resistor R38, a transistor Q7, a transistor Q8, a transistor Q9, a diode D8 and a diode D9, the secondary side coil of the current transformer CT1 applies the large current signal to the resistor R50 and the resistor R51 when the load is short-circuited, a voltage signal of the resistor R50 and the resistor R51 is transmitted to the rectifier unit, and the rectifier unit includes a rectifier U7A and a rectifier U7C, the rectifier U7A and the rectifier U7C input a rectified signal to a positive input port of the comparator U7D through the resistor R36, the comparator U7D is configured to compare a voltage of the positive input port with a voltage of a negative input port, when the voltage of the positive input port is higher than the voltage of the negative input port, an output port is controlled to output a high level;

the output port of the comparator U7D is connected to a base of the transistor Q7, and also to a collector of the transistor Q8, and the collector of the transistor Q8 is connected to the base of the transistor Q7, an emitter of the transistor Q7 is grounded, the collector of the transistor Q7 is connected to a negative pole of the diode D8, and a positive pole of the diode D8 is connected to the short-circuit protection module;

the collector of the transistor Q7 is connected to a negative pole of the diode D9, and a positive pole of the diode D9 is connected to the main control module.

In the above circuit, the short-circuit protection module includes a transistor Q3, a transistor Q4 and a driving optocoupler M1, a base of the transistor Q3 is connected to the positive pole of the diode D8, a collector of the transistor Q3 is connected to a base of the transistor Q4, an emitter of the transistor Q3 is grounded, when the diode D8 pulls down the base of transistor Q3, the collector and the emitter of the transistor Q3 are turned off, and a collector and an emitter of the transistor Q4 are turned on, an input port of the driving optocoupler M1 is short-circuited, the driving optocoupler M1 outputs a low level to the gates of the field effect transistor Q1 and the field effect transistor Q2, so that the drains and sources of the field effect transistor Q1 and the field effect transistor Q2 are turned off.

In the above circuit, the spike absorption module includes a resistor R71 and a capacitor C34, one end of the resistor R71 is connected to the drain of the field effect transistor Q1, and the other end of the resistor R71 is connected to one end of the capacitor C34, the other end of the capacitor C34 is connected to the drain of the field effect transistor Q2, and the spike absorption module absorbs spike voltages of the sources and drains of the field effect transistor Q1 and the field effect transistor Q2;

the resistor R71 and the capacitor C34 are also connected to the rectifying module.

In the above circuit, the rectifying module includes a rectifier bridge stack BD2 and a polar capacitor C37, and the rectifier bridge stack BD2 is configured to charge the polar capacitor C37 after rectifying the spike voltage;

both ends of the polar capacitor C37 are also connected to the clamping module.

In the above circuit, the clamping module includes a voltage-stabilizing diode D2, a voltage-stabilizing diode D4 and a voltage-stabilizing diode D7, a positive pole of the voltage-stabilizing diode D2 is connected to a negative pole of the polar capacitor C37, and a negative pole of the voltage-stabilizing diode D2 is connected to a positive pole of the voltage-stabilizing diode D4, a negative pole of the voltage-stabilizing diode D4 is connected to a positive pole of the voltage-stabilizing diode D7, and a negative pole of the voltage-stabilizing diode D7 is connected to a positive pole of the polar capacitor C37.

In the above circuit, the main control module includes a main control chip U200, a first pin of the main control chip U200 is connected to the positive pole of the diode D9, a forty-eighth pin of the main control chip U200 is connected to a base of the transistor Q9, a collector of the transistor Q9 is connected to the base of the transistor Q7, and the emitter of the transistor Q9 is grounded;

the first pin of the main control chip U200 outputs a control signal to the load regulator.

In the above circuit, the discharging module includes a resistor R74 and a resistor R78 connected in series, one end of the resistor R74 is connected to the positive pole of the polar capacitor C37, and one end of the resistor R78 is connected to the negative pole of the polar capacitor C37.

The beneficial effects of the present disclosure are that: the dimmer can be stopped regardless of any short-circuit state at the output end, and the dimmer can be well protected, when the short-circuit fault is removed, the software control automatically restarts and resumes normal operation, through multiple circuit protection, solves the problem of the dimmer caused by the short-circuit state such as the ignition of the lamp line or the failure of the driving power end of the LED lamp, thereby ensuring the reliability of the product and reducing the cost of after-sale maintenance services.

DETAILED DESCRIPTION

The present disclosure will be further described below in conjunction with the accompanying drawings and embodiments.

The concept, specific structure and technical effects of the present disclosure will be clearly and completely described below with reference to the embodiments and accompanying drawings, so that the purpose, characteristics and effects of the present disclosure can be fully understood. Apparently, the described embodiments are only some, but not all, embodiments of the present disclosure, based on the embodiments of the present disclosure, other embodiments obtained by those skilled in the art without creative efforts shall fall within the protection scope of the present disclosure. In addition, all the coupling/connection relationships involved in the present disclosure do not necessarily mean that the components are directly connected, but refer to a better coupling structure by adding or reducing coupling accessories according to the specific implementation. Various technical features in the present disclosure can be combined interactively on the premise of not contradicting each other.

Figure 1:
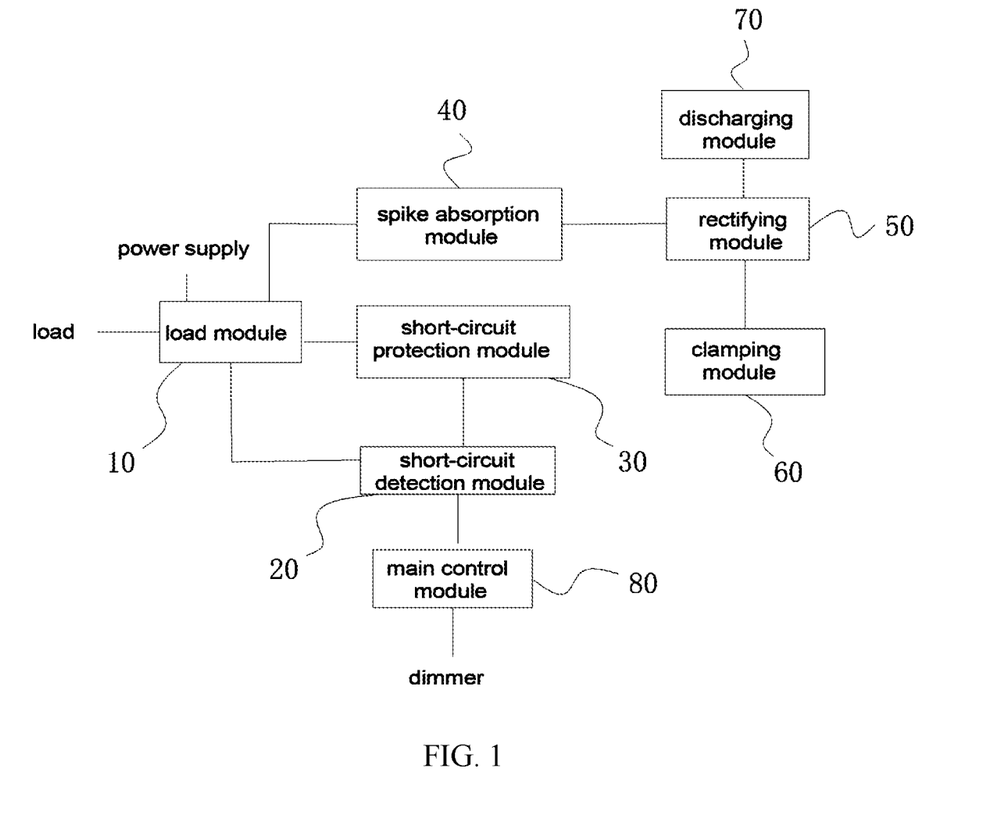
FIG. 1 is a structural block diagram of a BRCT clamping absorption circuit with short-circuit protection of the present disclosure.

Referring to FIG. 1, the present disclosure discloses a BRCT clamping absorption circuit with short-circuit protection, which includes a load module 10, a short-circuit detection module 20, a short-circuit protection module 30, a spike absorption module 40, a rectifying module 50, a clamping module 60, a discharging module 70 and a main control module 80, the load module 10 is connected to both the power supply and the load to provide a loop for the load, the short-circuit detection module 20 is connected to the load module 10, and sends a short-circuit signal when the load is short-circuited, and the short-circuit protection module 30 is connected to the short-circuit detection module 20, the short-circuit protection module 30 is connected to the load module 10, and the short-circuit protection module 30 cuts off the output current of the load module 10 when receiving the short-circuit signal from the short-circuit detection module 20, so as to prevent the load module 10 from being damaged due to a large short-circuit current, the spike absorption module 40 is connected to the load module 10, the rectifying module 50 is connected to the spike absorption module 40, and the clamping module 60 is connected to the rectifying module 50 to form clamping absorption protection for the spike voltage, the discharging module 70 is connected to the rectifying module 50 to discharge the rectifying module 50; the main control module 80 is connected to the short-circuit detection module 20, and controls the on-off of the load regulator (for example, the dimmer) according to the short-circuit signal, when a short circuit occurs, the output signal to the dimmer is stopped, and the dimmer stops. When the short circuit is removed, the output signal is restored to the dimmer, and the dimmer resumes normal operation. BRCT Notes: B=Bridge Rectifiers, R=Resistor, C=Capacitor, T=Transient Voltage Suppressors.

Figure 2A:
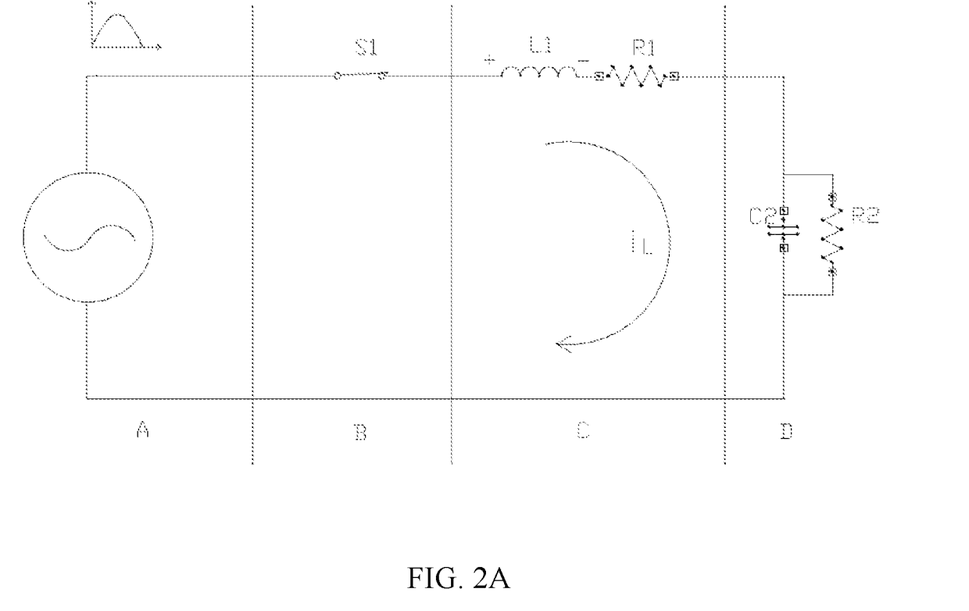
FIG. 2A and FIG. 2B are circuit block diagrams of the dimmer system.
Figure 2B:
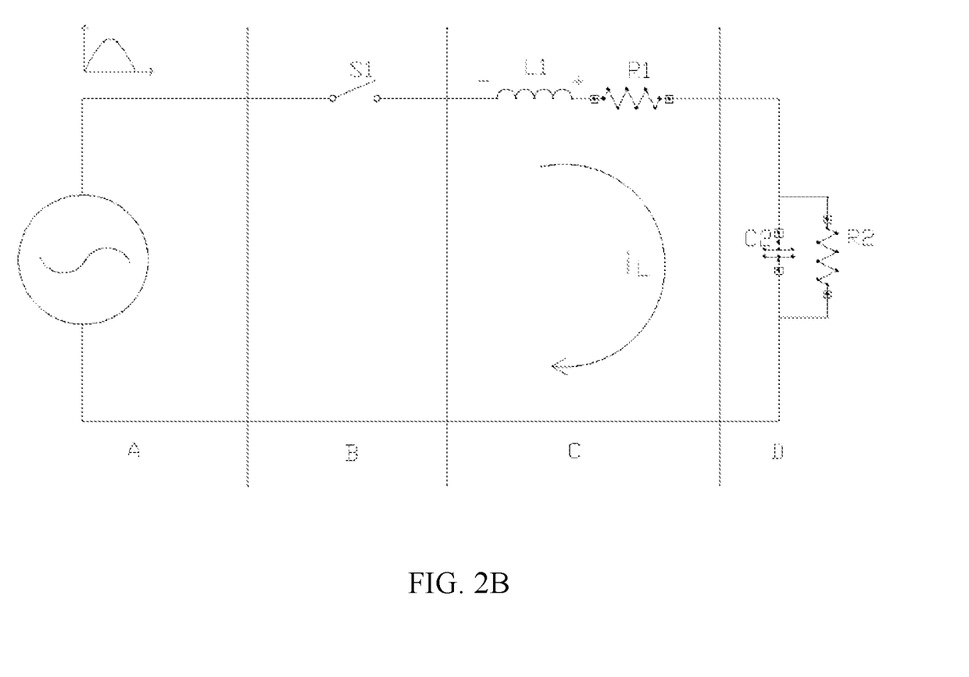

For the convenience of analysis and understanding, referring to FIG. 2A and FIG. 2B, the circuit block diagrams of the dimmer system, in which: A area represents the AC power supply; in B area, S1 represents the main power switch tube of the dimmer, namely the field effect transistor Q1 and the field effect transistor Q2; in C area, L1, R1 represent the parasitic inductance and equivalent resistance of the lamp line (at the user site, the cable between the dimmer and the LED lamp will generally exceed 100 meters, and the parasitic inductance in the cable increases with the length of the cable); in D area, C2, R2 represent the equivalent capacitive reactance and impedance of the load LED lamp. As shown in FIG. 2A, when the switch S1 is turned on, there will be no abnormality in the circuit. However, when a short circuit occurs, it means that there is a large current flowing, and the protection circuit forces the switch S1 to turn off (that is, the field effect transistor Q1 and the field effect transistor Q2 are turned off) instantly, as shown in FIG. 2B, due to the effect of the parasitic inductance L1, a back electromotive force will be generated at one end of the S1 load (the drain of the field effect transistor Q2), forming a high spike voltage, if there is no additional circuit to suppress or absorb this voltage spike, then it will exceed the rated withstand voltage of the field effect transistor Q1 and field effect transistor Q2, breaking down the field effect transistor Q1 and field effect transistor Q2.

Figure 3:
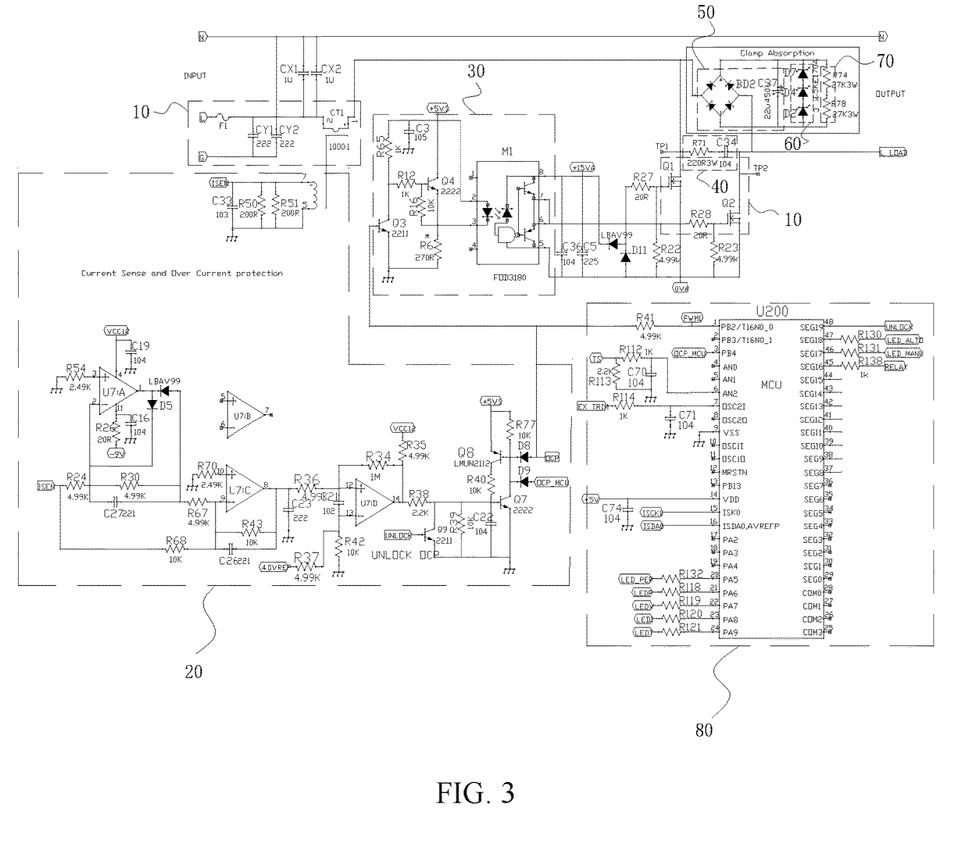
FIG. 3 is a circuit structure diagram of a BRCT clamping absorption circuit with short-circuit protection of the present disclosure.
Figure 4:
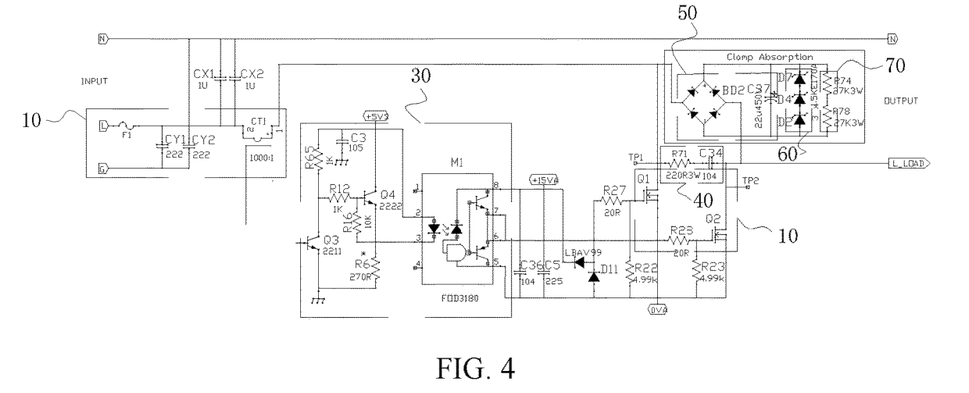
FIG. 4 is a circuit structure diagram of the load module, the short-circuit protection module, the spike absorption module, the rectifying module, the clamping module and the discharging module in FIG. 3.
Figure 5:
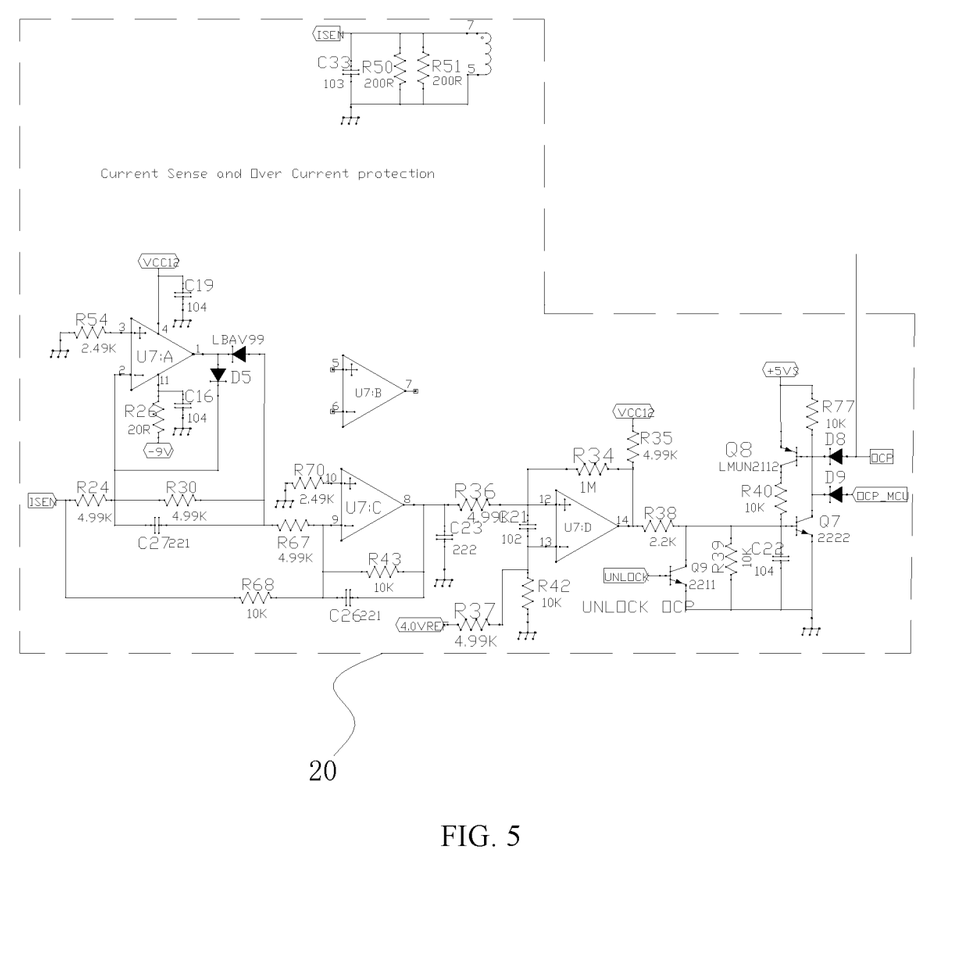
FIG. 5 is a circuit structure diagram of the short-circuit detection module in FIG. 3.

Referring to FIG. 3 and FIG. 4, the load module 10 includes a fuse F1, a current transformer CT1, a field effect transistor Q1 and a field effect transistor Q2, further referring to FIG. 5, the short-circuit detection module 20 includes a resistor R50, a resistor R51, a rectifier unit, a resistor R36, a comparator U7D, a resistor R38, a transistor Q7, a transistor Q8, a transistor Q9, a diode D8 and a diode D9, one end of the fuse F1 is connected to the L line of the power supply, the other end of the fuse F1 is connected to one end of the primary side of the current transformer CT1, and the other end of the primary side of the current transformer CT1 is connected to the drain of the field effect transistor Q1, the source of the field effect transistor Q1 is grounded, the gate of the field effect transistor Q1 is connected to the short circuit protection module 30, the drain of the field effect transistor Q2 is connected to the L line of the load, the gate of the field effect transistor Q2 is connected to the short circuit protection module 30, and the source of the field effect transistor Q2 is grounded; the secondary side coil of the current transformer CT1 applies a large current signal to the resistor R50 and the resistor R51 when the load is short-circuited, and the voltage signal of the resistor R50 and the resistor R51 is transmitted to the rectifier unit, the rectifier unit includes a rectifier U7A and a rectifier U7C, and the rectifier U7A and the rectifier U7C input the rectified signal to the positive input port of the comparator U7D through the resistor R36, the comparator U7D is used to compare the voltage of the positive input port with the voltage of the negative input port. When the voltage of the positive input port is higher than the voltage of the negative input port, the output port is controlled to output a high level; the output port of the comparator U7D is connected to the base of the transistor Q7, and also to the collector of the transistor Q8, and the collector of the transistor Q8 is connected to the base of the transistor Q7, the emitter of the transistor Q7 is grounded, the collector of the transistor Q7 is connected to the negative pole of the diode D8, and the positive pole of the diode D8 is connected to the short-circuit protection module 30; the collector of the transistor Q7 is connected to the negative pole of the diode D9, and the positive pole of the diode D9 is connected to the main control module 80.

The short-circuit protection module 30 includes a transistor Q3, a transistor Q4 and a driving optocoupler M1, the model of the driving optocoupler M1 is FOD3180, the base of the transistor Q3 is connected to the positive pole of the diode D8, the collector of the transistor Q3 is connected to the base of the transistor Q4, and the emitter of the transistor Q3 is grounded. When the diode D8 pulls down the base of the transistor Q3, the collector and the emitter of the transistor Q3 are turned off, and the collector and the emitter of the transistor Q4 are turned on, short-circuiting the input port of the driving optocoupler M1. The driving optocoupler M1 outputs a low level to the gates of the field effect transistor Q1 and the field effect transistor Q2, so that the drain and source electrodes of the field effect transistor Q1 and the field effect transistor Q2 are turned off.

The spike absorption module 40 includes a resistor R71 and a capacitor C34, the rectifying module 50 includes a rectifier bridge stack BD2 and a polar capacitor C37, the clamping module 60 includes a voltage-stabilizing diode D2, a voltage-stabilizing diode D4 and a voltage-stabilizing diode D7, the discharging module 70 includes a resistor R74 and a resistor R78 connected in series, and both ends of the polar capacitor C37 are also connected to the clamping module 60, One end of the resistor R71 is connected to the drain of the field effect transistor Q1, and the other end of the resistor R71 is connected to one end of the capacitor C34, the other end of the capacitor C34 is connected to the drain of the field effect transistor Q2, and absorbs the spike voltage of the source and drain of the field effect transistor Q1 and the field effect transistor Q2; the resistor R71 and the capacitor C34 are also connected to the rectifier bridge stack BD2, and the rectifier bridge stack BD2 rectifies the spike voltage and charges the polar capacitor C37; the positive pole of the voltage-stabilizing diode D2 is connected to the negative pole of the polar capacitor C37, and the negative pole of the voltage-stabilizing diode D2 is connected to the positive pole of the voltage-stabilizing diode D4. The negative pole of the voltage-stabilizing diode D4 is connected to the positive pole of the voltage-stabilizing diode D7, and the negative pole of the voltage-stabilizing diode D7 is connected to the positive pole of the polar capacitor C37; one end of the resistor R74 is connected to the positive pole of the polar capacitor C37, and one end of the resistor R78 is connected to the negative pole of the polar capacitor C37.

Figure 6:
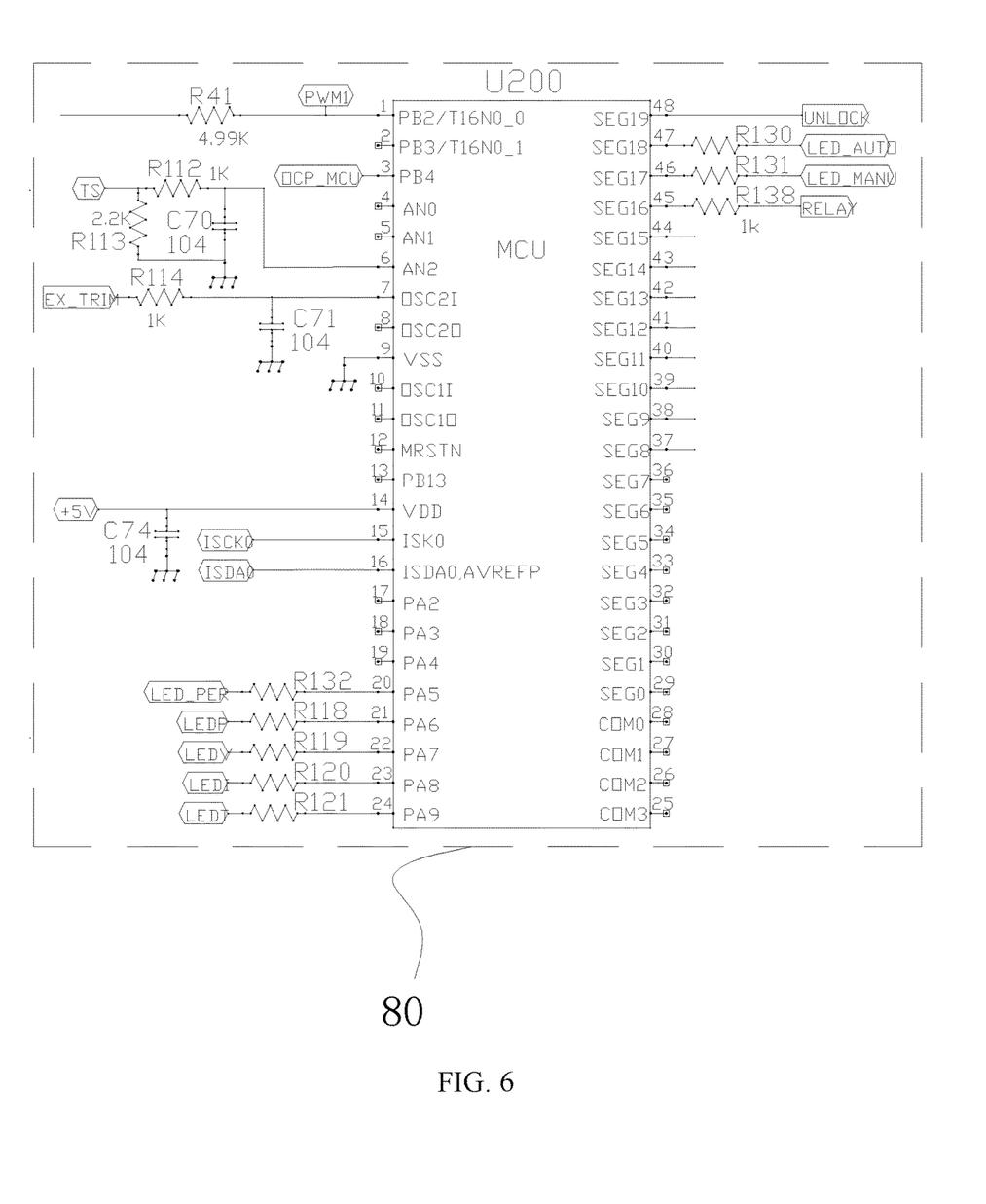
FIG. 6 is a circuit structure diagram of the main control module in FIG. 3.

Further referring to FIG. 6, the main control module 80 includes a main control chip U200, the first pin of the main control chip U200 is connected to the positive pole of the diode D9, the forty-eighth pin of the main control chip U200 is connected to the base of the transistor Q9, the collector of the transistor Q9 is connected to the base of the transistor Q7, and the emitter of the transistor Q9 is grounded; the first pin of the main control chip U200 outputs a control signal to the dimmer.

Further referring to FIG. 3, FIG. 4, FIG. 5 and FIG. 6, the load is connected between the output terminal L_LOAD and the N line, when an overcurrent or short circuit occurs, the large current flows through the fuse F1, the primary side of the current transformer CT1, the field effect transistor Q1, the field effect transistor Q2, the load and the cable, etc., and then returns to the N line to form the entire circuit. When a large current flows through the primary side of the current transformer CT1, its secondary side coil will induce a current signal of equal proportion (actually 1000:1), applying to the detection resistors R50 and R51, the greater the current, the voltage on the detection resistor (ISEN signal) will increase proportionally, the ISEN signal passes through the electronic rectifier composed of rectifier U7A and rectifier U7C (similar to the effect of rectifier diode, the advantage of electronic rectification is that there is no offset loss of PN junction, and the waveform is not distorted), the steamed bun wave of DC component is output at the 8th pin of the rectifier U7C, and then through the resistor R36, it is input to the positive input port of the comparator U7D (Pin 12 in the figures), and compared with the reference voltage of the negative input port (Pin 13 in the figures), if the voltage exceeds 2.667V, then the output port (Pin 14 in the figures) will output a high level, the base of the transistor Q7 is positively biased through the resistor R38, the collector and the emitter of the transistor Q7 are turned on, the base of the transistor Q8 becomes low level, the collector and the emitter of the transistor Q8 are turned on, the high level is added to the base of the transistor Q7 through the resistor R40, forcing the collector and the emitter of the transistor Q7 to continue to conduct; the collector of the transistor Q7 quickly pulls down the base of the transistor Q3 through the diode D8, the collector and emitter of the transistor Q3 are turned off, the collector and the emitter of the transistor Q4 are turned on, and the second and third pins of the driving optocoupler M1 are short-circuited. The 6th and 7th pins of the driving optocoupler M1 output a low level, and the gate voltages of the field effect transistor Q1 and the field effect transistor Q2 are low level, the drain and source of the field effect transistor Q1 are cut off, the drain and source of the field effect transistor Q2 are cut off, the output current is cut off, and the field effect transistor Q1 and field effect transistor Q2 are protected in time. The risk of damage due to overheating due to high current is avoided. However, in the actual circuit, due to the existence of the parasitic inductance and capacitive reactance of the cable at the load end (the LED drive power has input capacitance), at the moment when the large current is disconnected, the parasitic inductance will generate a back electromotive force, forming a voltage spike, which is superimposed on the drain and source ends of the field effect transistor Q1 and the drain and source ends of the field effect transistor Q2. At this time, the rectifier bridge stack BD2 will rectify this voltage spike and then charge the capacitor C37. Microscopically, the two ends of the capacitor are equivalent to a constant voltage source. Using the principle that the voltage across the large capacitor cannot change abruptly, during the charging process, the rising slope of the spike voltage is forced to become slow, and the high spike voltage is suppressed to break down the main power MOS transistor FET Q1 and FET Q2. Resistor R74 and resistor R78 discharge the capacitor C37, and at the same time connect the transient suppression diode TVS tube in parallel at both ends of the capacitor C37 (the voltage-stabilizing diode D2, voltage-stabilizing diode D4 and voltage-stabilizing diode D7 are connected in series), to prevent the load power and capacitive reactance from being too large, and to avoid the generated back electromotive force energy being larger, the voltage on the capacitor C37 will be higher. When the avalanche voltage of the TVS tube (i.e. voltage-stabilizing diode D2, voltage-stabilizing diode D4 and voltage-stabilizing diode D7) is exceeded, it will turn on and absorb the spike current and enter the clamping state. The clamping voltage is below the withstand voltage of the field effect transistor Q1 and field effect transistor Q2 of 650V, which realizes double protection of the main power transistor (i.e. field effect transistor Q1 and field effect transistor Q2). The other way of the collector of the transistor Q7 pulls down the third pin of the main control chip U200 through the diode D9, after the software program makes a judgment, it quickly enters the protection, forcing the first pin of the main control chip U200 to stop outputting the PWM waveform, which also stops the output of the dimmer, and the dimmer stops. After that, the program delays for one minute, restarts the work automatically, and outputs a high level of 2 ms from the 48th pin of the main control chip U200, so that the collector and emitter of the transistor Q9 are turned on, and the base of the transistor Q7 is pulled down. The collector of the transistor Q7 becomes a high level, the collector and the emitter of the transistor Q8 are turned off, forming an unlock, and the dimmer can achieve dimming normally; if the short circuit is not removed, the BRCT clamping and absorbing circuit with short-circuit protection will continue to protect again, and so on, until the short-circuit is removed, the dimmer automatically resumes normal operation and can achieve dimming.

A BRCT clamping absorption circuit with short-circuit protection of the present disclosure realizes that the dimmer can be stopped regardless of any short-circuit state at the output end, and the dimmer can be well protected, when the short-circuit fault is removed, the software control automatically restarts and resumes normal operation, through multiple circuit protection, solves the problem of the dimmer caused by the short-circuit state such as the ignition of the lamp line or the failure of the driving power end of the LED lamp, thereby ensuring the reliability of the product and reducing the cost of after-sale maintenance services.

The above is a specific description of the preferred implementation of the present disclosure, but the present disclosure is not limited to the embodiment, those skilled in the art can make various equivalent modifications or substitutions without departing from the spirit of the present disclosure, and these equivalent modifications or substitutions are all included within the scope defined by the claims of the present application.

What is claimed is:

1. A BRCT clamping absorption circuit with short circuit protection, comprising a load module, a short-circuit detection module, a short-circuit protection module, a spike absorption module, a rectifying module, a clamping module and a main control module, wherein, the load module is connected to a power supply and a load, and is configured to provide a loop for the load;

the short-circuit detection module is connected to the load module for sending a short-circuit signal when the load is short-circuited;

the short-circuit protection module is connected with the short-circuit detection module, and the short-circuit protection module is connected with the load module, and is used for cutting off an output current of the load module when receiving the short-circuit signal of the short-circuit detection module;

the spike absorption module is connected with the load module, the rectifying module is connected with the spike absorption module, and the clamping module is connected with the rectifying module to form a clamping absorption protection for a spike voltage;

the main control module is connected with the short-circuit detection module, and is used for controlling the on-off of a load regulator according to the short-circuit signal.

2. The BRCT clamping absorption circuit with short circuit protection of claim 1, further comprising a discharging module, which is connected to the rectifying module for discharging the rectifying module.

3. The BRCT clamping absorption circuit with short circuit protection of claim 2, wherein the load module comprises a fuse F1, a current transformer CT1, a field effect transistor Q1 and a field effect transistor Q2, one end of the fuse F1 is connected to a L line of the power supply, and the other end of the fuse F1 is connected to one end of a primary side of the current transformer CT1, the other end of the primary side of the current transformer CT1 is connected to a drain of the field effect transistor Q1, a source of the field effect transistor Q1 is grounded, and a gate of the field effect transistor Q1 is connected to the short-circuit protection module, a drain of the field effect transistor Q2 is connected to the L line of the load, a gate of the field effect transistor Q2 is connected to the short-circuit protection module, and a source of the field effect transistor Q2 is grounded;

wherein a secondary side coil of the current transformer CT1 is connected to the short-circuit detection module for providing a large current signal to the short-circuit detection module when the load is short-circuited.

4. The BRCT clamping absorption circuit with short circuit protection of claim 3, wherein, the short-circuit detection module comprises a resistor R50, a resistor R51, a rectifier unit, a resistor R36, a comparator U7D, a resistor R38, a transistor Q7, a transistor Q8, a transistor Q9, a diode D8 and a diode D9, the secondary side coil of the current transformer CT1 applies the large current signal to the resistor R50 and the resistor R51 when the load is short-circuited, a voltage signal of the resistor R50 and the resistor R51 is transmitted to the rectifier unit, and the rectifier unit comprises a rectifier U7A and a rectifier U7C, the rectifier U7A and the rectifier U7C input a rectified signal to a positive input port of the comparator U7D through the resistor R36, the comparator U7D is configured to compare a voltage of the positive input port with a voltage of a negative input port, when the voltage of the positive input port is higher than the voltage of the negative input port, an output port is controlled to output a high level;

wherein the output port of the comparator U7D is connected to a base of the transistor Q7, and also to a collector of the transistor Q8, and the collector of the transistor Q8 is connected to the base of the transistor Q7, an emitter of the transistor Q7 is grounded, a collector of the transistor Q7 is connected to a negative pole of the diode D8, and a positive pole of the diode D8 is connected to the short-circuit protection module;

wherein the collector of the transistor Q7 is connected to a negative pole of the diode D9, and a positive pole of the diode D9 is connected to the main control module.

5. The BRCT clamping absorption circuit with short circuit protection of claim 4, wherein, the short-circuit protection module comprises a transistor Q3, a transistor Q4 and a driving optocoupler M1, a base of the transistor Q3 is connected to the positive pole of the diode D8, a collector of the transistor Q3 is connected to a base of the transistor Q4, and an emitter of the transistor Q3 is grounded, when the diode D8 pulls down the base of transistor Q3, the collector and the emitter of the transistor Q3 are turned off, and a collector and an emitter of the transistor Q4 are turned on, an input port of the driving optocoupler M1 is short-circuited, the driving optocoupler M1 outputs a low level to the gates of the field effect transistor Q1 and the field effect transistor Q2, so that the drains and sources of the field effect transistor Q1 and the field effect transistor Q2 are turned off.

6. The BRCT clamping absorption circuit with short circuit protection of claim 5, wherein, the spike absorption module comprises a resistor R71 and a capacitor C34, one end of the resistor R71 is connected to the drain of the field effect transistor Q1, and the other end of the resistor R71 is connected to one end of the capacitor C34, the other end of the capacitor C34 is connected to the drain of the field effect transistor Q2, and the spike absorption module absorbs spike voltages of the sources and drains of the field effect transistor Q1 and the field effect transistor Q2;

wherein the resistor R71 and the capacitor C34 are also connected to the rectifying module.

7. The BRCT clamping absorption circuit with short circuit protection of claim 6, wherein, the rectifying module comprises a rectifier bridge stack BD2 and a polar capacitor C37, and the rectifier bridge stack BD2 is configured to charge the polar capacitor C37 after rectifying the spike voltage;

wherein both ends of the polar capacitor C37 are also connected to the clamping module.

8. The BRCT clamping absorption circuit with short circuit protection of claim 7, wherein, the clamping module comprises a voltage-stabilizing diode D2, a voltage-stabilizing diode D4 and a voltage-stabilizing diode D7, a positive pole of the voltage-stabilizing diode D2 is connected to a negative pole of the polar capacitor C37, and a negative pole of the voltage-stabilizing diode D2 is connected to a positive pole of the voltage-stabilizing diode D4, a negative pole of the voltage-stabilizing diode D4 is connected to a positive pole of the voltage-stabilizing diode D7, and a negative pole of the voltage-stabilizing diode D7 is connected to a positive pole of the polar capacitor C37.

9. The BRCT clamping absorption circuit with short circuit protection of claim 8, wherein, the main control module comprises a main control chip U200, a first pin of the main control chip U200 is connected to the positive pole of the diode D9, a forty-eighth pin of the main control chip U200 is connected to a base of the transistor Q9, a collector of the transistor Q9 is connected to the base of the transistor Q7, and the emitter of the transistor Q9 is grounded;

wherein, the first pin of the main control chip U200 outputs a control signal to the load regulator.

10. The BRCT clamping absorption circuit with short circuit protection of claim 7, wherein, the discharging module comprises a resistor R74 and a resistor R78 connected in series, one end of the resistor R74 is connected to the positive pole of the polar capacitor C37, and one end of the resistor R78 is connected to the negative pole of the polar capacitor C37.

* * * * *